3,707,348
CELLULOSE DYED WHILE WATER SWOLLEN IN A GLYCOL BATH WITH ANTHRAPYRIMIDINE DYE
John Blackwell, Kennett Square, Pa., and Edward Sherlock Wilks, Penns Grove, N.J., assignors to E. I. du Pont de Nemours and Company, Wilmington, Del.
No Drawing. Filed June 28, 1971, Ser. No. 157,753
Int. Cl. D06p 3/82
U.S. Cl. 8—21 C          5 Claims

ABSTRACT OF THE DISCLOSURE

Water swellable cellulosic fibers, for example, cotton, or blends or mixtures thereof with synthetic fibers, for example, polyester fibers, uniformly dyed in orange to violet shades with essentially water insoluble, non-vattable, anthrapyrimidine dyes, for example, 2-phenyl-4-bromo-6-(p-toluidino)anthrapyrimidine, said dyed fibers having excellent fastness to light, washing, drycleaning and sublimation and exhibiting a reflectance color value (S') after scour of at least about 0.4.

BACKGROUND OF THE INVENTION

(1) Field of the invention

This invention relates to uniformly dyed water swellable cellulosic fibers and to dyed mixtures or blends of such water swellable cellulosic fibers and synthetic fibers.

(2) Description of the prior art

It is well known in the art that synthetic fibers, for example, fibers prepared from polyesters, polyamides or cellulose acetate, can be dyed with a wide variety of disperse dyes whose solubilities in water vary from very low to moderately high.

Natural fibers such as water swellable cellulosic fibers, especially cotton, are dyed by processes, and with dyes, which usually differ markedly from the processes and dyes employed with synthetic fibers. The conventional methods for dyeing water swellable cellulosic materials may be summarized as follows:

(1) A high molecular weight water insoluble dye is formed within the material, either by reacting two smaller components, as in the formation of an azoic dye by a coupling reaction, or by a chemical reaction which renders insoluble a soluble dye precursor, as in vat and mordant dyeing.

(2) A water soluble preformed dye having an affinity for the cellulosic material is exhausted onto the material from an aqueous solution by a procedure which involves reducing the solubility of the dye in the aqueous solution, as with direct dyes.

(3) A dye containing a substituent which reacts with the cellulose or a modified cellulose is exhausted onto the material from either an aqueous or non-aqueous solution under conditions such that the dye is chemically bonded to the substrate, as with fiber reactive dyes.

(4) Water insoluble pigments are bonded to the cellulose with polymeric materials, as in pigment printing.

(5) A finely divided form of a water insoluble dye is incorporated into the cellulose during a manufacturing step, as is sometimes done during spinning of viscose rayon.

None of these conventional procedures can be used to dye water swellable cellulose by directly introducing into the material a preformed, nonreactive, water insoluble dye since such dyes have little natural affinity for or substantivity to such cellulosic materials.

Representative of the aforesaid processes wherein dyes are formed in situ after a precursor is deposited on or within the cellulose are processes disclosed in U.S. Pats. 396,692 and 2,069,215 and British Pat. 1,071,074. A process employing water soluble preformed dyes for dyeing cellulose is discussed in the Journal of the Society of Dyers and Colourists, 73, 23 (1957).

The aforesaid processes suffer from a variety of disadvantages, such as complexity of application, inability to achieve a broad spectrum of colors, and low fastness of the dyed cellulose to aqueous washing and/or drycleaning with organic solvents.

The use of dyes of low water solubility for dyeing cotton is disclosed in British Pat. 1,112,279. The process involves the application of dye, water and urea or a structurally related compound to the substrate, followed by heating. In such a process dye utilization frequently is poor and undesirable basic degradation products from the urea or related compound may be formed.

Problems in addition to the above are encountered in the use of prior art dyes and dyeing processes for blends or mixtures of water swellable cellulosic and synthetic materials. Generally, complex two-stage processes are required and the components of the blend or mixture are dyed in separate steps with different dyes. Cross-staining may result and the amounts of dyes required usually are high, with each component undesirably interfering with the dyeing of the other. When cross-staining occurs, the dye must be capable of being scoured off the stained component. Even under optimum conditions, however, shade match on both components of the blend is difficult to achieve. The complexity of the two-stage process for dyeing blends also is apparent from a consideration of the divergency of operating conditions between conventional dyeing processes for water swellable cellulosic materials and synthetic materials. In contrast to the aforesaid procedures for dyeing water swellable cellulose, the usual procedures for dyeing synthetic materials are based on dissolution of water insoluble dyes in the synthetic material.

Representative of prior art on the dyeing of blends of such cellulosic and synthetic materials employing a two-stage process in U.S. Pat. 3,313,590. Analogous to the dyeing of such blends and confirming the aforesaid distinction between water swellable cellulosic materials and non-water swellable cellulose acetate, U.S. Pat. 3,153,563 discloses a two-stage process wherein the cellulose acetate is dyed with a water insoluble dye without coloring the cellulose which then is dyed in an independent step.

The swelling of cotton fibers and other similar cellulosic materials by water has long been known. Swelling usually is rapid upon contact with water, but it is facilitated by wetting agents and by heat. The swollen materials are enlarged, more flexible, reduced in strength, and otherwise modified in physical and mechanical properties. Because of their open structure, swollen cellulosic materials can be penetrated by and reacted with low molecular weight water soluble compounds. Valko and Limdi in Textile Research Journal, 32, 331–337 (1962) report that cotton can be swollen with water containing both high boiling, water soluble, nonreactive compounds of limited molecular weight and a crosslinking agent. The water can be removed with retention of swelling and crosslinking can then be effected. The authors suggest that the technique may be useful not only for the introduction into cotton of water soluble reactive materials (crosslinking agents) but also other reactive materials which are insoluble in water but soluble in said high boiling, water soluble, nonreactive compound. A similar technique is described in U.S. Pat. 2,339,913 issued Jan. 25, 1944 to Hanford and Holmes. The cellulosic is swollen with water, the water then is replaced with methanol-benzene and finally with benzene, with retention of swelling. A cellulose-reactive material (crosslinking agent) is added as a benzene solution and crosslinking is effected.

Blackwell, Gumprecht and Starn in Canadian Pat. 832,343 disclose a process for dyeing water swellable cellulosic materials with preformed disperse dyes, that is, dyes which do not require an in situ chemical reaction, such as oxidation or reduction, for development of color on the substrate, such as a fabric, which process comprises contacting the water swellable cellulosic material in any sequence with the following:

(1) water in an amount sufficient to swell the cellulose;
(2) a preformed dye in an amount sufficient to color the cellulose, a boiling saturated solution of which dye in 0.1 molar aqueous sodium carbonate exhibits an optical absorbance not in excess of about 30; and
(3) a solvent in an amount sufficient to maintain swelling of the cellulose if water is removed, and which
   (a) is at least 2.5 weight percent soluble in water at 25° C.,
   (b) boils above about 150° C. at atmospheric pressure,
   (c) is a solvent for the dye at some temperature in the range of about 0° to 225° C., and
   (d) has the formula $$R(O-\underset{\underset{C_nH_{2n+1}}{|}}{CH}-CH_2)_mR^1 \text{ or } [R(O-\underset{\underset{C_nH_{2n+1}}{|}}{CH}-CH_2)_mO]_xA$$

wherein
$n$ is 0 or 1;
$m$ is a positive whole number;
R is H, $C_{1-8}$ alkyl, $C_{7-15}$ aralkyl or alkaryl, $$R^2\underset{\underset{O}{||}}{C}-, \ R^2SO_2-, \text{ or } R^2O\underset{\underset{O}{||}}{C}-$$

wherein $R^2$ is $C_{1-8}$ alkyl, $C_{5-10}$ cycloalkyl, $C_{7-15}$ aralkyl or alkaryl, $C_6$ aryl, $C_{10}$ aryl, or furfuryl;
$R^1$ is —OH, —$OR^2$, —$SR^2$, —$NHR^2$, —$NR^2(C_{1-8}$ alkyl)

—$NR^2(C_{7-15}$ aralkyl or alkaryl),

—$O\underset{\underset{O}{||}}{C}R^2$, —$OSO_2R^2$, —$O\underset{\underset{OR^2}{|}}{C}OR^2$ —NH(phenyl), or —NH(naphthyl), wherein $R^2$ is as defined above;
$x$ is the number of unsatisfied valencies in A; and
A is $ROCH_2CHORCH_2$—,

—$CH_2CHORCH_2$—

—$CH_2\overset{|}{C}HCH_2$—

—$CH_2C(CH_2OR)_3$, (—$CH_2)_2C(CH_2OR)_2$ (—$CH_2)_3CCH_2OR$, (—$CH_2)_4C$,

—$CH_2(CHOR)_yCH_2OR$

—$CH_2(CHOR)_yCH_2$—, or

—$CH_2$—$(CHOR)_{y-z}(-CH)_zCH_2$— in which $y$ is 2, 3, or 4 $z$ is 0, 1, 2 or 4 but no greater than $y$ and R is as defined above;

provided that at some stage during the process the interior of the swollen cellulose is contacted with a solution of the preformed dye in aqueous solvent or solvent.

Particular embodiments of the aforesaid process include those wherein said solution is formed within and/or outside the swollen cellulose and those wherein solution of dye in aqueous dye solvent or dye solvent is achieved by means of heat, by reducing the proportion of water to dye solvent, or by adding an auxiliary solvent. Embodiments of the process also include dyeing at elevated temperatures.

Still other embodiments of the aforesaid process include the dyeing of blends or mixtures of cellulosic and synthetic materials, such as polyamide or polyester, with the same dye. In such a process the cellulose is dyed as described above and the synthetic material is dyed either at the same time or in an independent step of the process.

Anthrapyrimidine dyes for cotton and wool are disclosed in U.S. Pats. 2,040,860 and 2,557,328 and in British Pat. 775,960. Such dyes are applied to cotton by conventional vatting procedures. U.S. Pat. 2,212,928 discloses 4-bromo-2-phenyl-6-(p-toluidino)anthrapyrimidine.

OBJECTS AND SUMMARY OF THE INVENTION

It is an object of the present invention to provide uniformly dye fibers. A further object is to provide uniformly dyed water swellable cellulosic fibers and uniformly dyed blends or mixtures of water swellable cellulosic fibers and synthetic fibers, especially cotton-polyester blends. Still another object is to provide uniformly dyed orange to violet fibers which are fast to light, washing, drycleaning and sublimation and which exhibit a reflectance color value (S') after scour of at least about 0.4. Another object is to provide water swellable cellulosic fibers which have been dyed with essentially water insoluble, non-vattable anthrapyrimidine dyes.

The present invention resides in uniformly dyed orange to violet water swellable cellulosic fibers or blends or mixtures of water swellable cellulosic fibers and synthetic fibers, said dyed fibers being fast to light, washing, drycleaning and sublimation and exhibiting a reflectance color value (S') of at least about 0.4 after one thorough scour in aqueous detergent at 90°–100° C. and one thorough scour in perchloroethylene at 50° C., wherein said dyed fibers the dye comprises the anthrapyrimidine dye having the formula wherein
X is H, Cl, Br, CN, $CONR^2R^3$, alkyl, $NH_2$, $N^2R^3$, $OR^4$ or $$S-\underset{\underset{R^6}{\diagdown}}{\overset{\overset{R^5}{\diagup}}{\bigcirc}}$$

$$Y \text{ is } -\underset{\underset{R^9}{\diagdown}}{\overset{\overset{R^8}{\diagup}}{\bigcirc}}$$

$R^1$ is H, alkyl or Oalkyl,
$R^2$ is H or $C_{1-4}$ alkyl,
$R^3$ is alkyl, cyclohexyl or

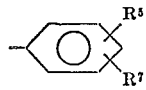

$R^4$ is alkyl, cyclohexyl, —$C_2H_4$Oalkyl, —$C_2H_4$phenyl, —$C_2H_4$Ophenyl or

$R^5$ is H, alkyl or Oalkyl,
$R^6$ is H, F, Cl, Br, alkyl, Oalkyl, NHCOalkyl or NHCOaryl,
$R^7$ is H, alkyl, Oalkyl, NHCOalkyl or NHCOaryl,
$R^8$ is H, F, Cl, Br, alkyl, Oalkyl, NHCOalkyl or NHCOaryl, and
$R^9$ is H, F, Cl, Br, alkyl, Oalkyl, NHCOalkyl, NHCOaryl, aryl, aryloxy, $CF_3$, CN, COalkyl, COaryl, $CO_2$alkyl, $CO_2$aryl, CONHalkyl, CON(alkyl)$_2$, CONHaryl or CON(alkyl)aryl, wherein said X, $R^1$ and $R^3$ through $R^9$, alkyl is $C_{1-12}$ alkyl and aryl is phenyl or phenyl substituted with Cl, Br, $C_{1-4}$ alkyl or $C_{1-4}$ alkoxy.

DETAILED DESCRIPTION OF THE INVENTION

The aforesaid anthrapyrimidine dyes which are used in the preparation of the dyed fibers of this invention are prepared by conventional processes and techniques. For example, the anthrapyrimidine dyes can be prepared from 1-amino - 4 - haloanthraquinone, 1-amino-2-alkyl-4-haloanthraquinone or 1 - amino - 2,4 - dihaloanthraquinone, where halo is chloro or bromo and alkyl contains 1–12 carbon atoms. These starting materials may be first converted to the corresponding 4-arylamino compounds by condensation with an aromatic amine, such as given in Table 1, by well-known methods.

TABLE 1

| | |
|---|---|
| Aniline | 4'-amino-3-anisanilide |
| o-, m- or p-toluidine | p-Aminobenzophenone |
| o-, m- or p-ethylaniline | 4-amino-3-bromobenzophenone |
| o-, m- or p-anisidine | o-, m- or p-aminoacetophenone |
| o-, m- or p-phenetidine | m-Aminobenzoic acid, butyl ester |
| o-, m- or p-fluoroaniline | 2,3-, 2,5-, 3,4- or 3,5-dichloroaniline |
| o-, m- or p-chloroaniline | 2-chloro-5-trifluoromethylaniline |
| o-, m- or p-bromoaniline | 3-chloro-2-methylaniline |
| 2,3-, 2,4-, 2,5-, 3,4- or 3,5-xylidine | 4-chloro-2-methylaniline |
| 2,4-, 2,5-, 3,4- or 3,5-dimethoxyaniline | 5-chloro-2-methylaniline |
| 3,4-diethoxyaniline | 2-chloro-4-methylaniline |
| 2-methoxy-5-methylaniline | 3-chloro-4-methylaniline |
| 3-isopropyl-4-anisidine | |
| p-n-Butylaniline | 2-chloro-5-methylaniline |
| p-n-Octylaniline | 5-chloro-2-methoxyaniline |
| p-n-Dodecylaniline | 2-chloro-5-methoxyaniline |
| p-Butoxyaniline | 4-fluoro-2-methylaniline |
| p-Phenoxyaniline | 5-fluoro-2-methylaniline |
| m-Aminobenzotrifluoride | p-Cyanoaniline |
| p-Aminoacetanilide | p-Aminobenzoic acid, dodecyl ester |
| p-Aminododecanoylanilide | Anthranilic acid, methyl ester |
| 3'-aminobenzanilide | 3'-amino-3-chlorobenzanilide |
| 3'-amino-4-n-butylbenzanilide | p-Aminobenzoic acid, N,N,-diethylamide |
| 3-aminobenzoic acid, p-t.-butylphenyl ester | 5-amino-2-chlorobenzanilide |
| 4-aminobenzoic acid, m-bromophenyl ester | p-Aminobenzoic acid, N-methyl anilide |
| Anthranilic acid, N-octylamide | p-Aminobenz (p-n-butylanilide) |
| | α-naphthylamine |

The condensation reaction of the aforesaid anthraquinone and aromatic amine is effected by heating an anthraquinone having the formula

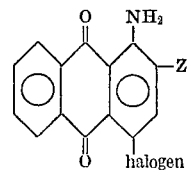

wherein Z is H, $C_{1-12}$ alkyl, Br or Cl and halogen is Cl or Br with at least one molar equivalent of the amine in a suitable solvent, such as o-dichlorobenzene, nitrobenzene or an excess of the amine itself. It may be advantageous to add an inorganic acid acceptor, such as an alkali metal carbonate or acetate. Copper powder, a cuprous or cupric salt, or a mixture thereof also may be added to promote the reaction. The resulting 4-arylaminoanthraquinone can be converted to the corresponding anthrapyrimidine by well-known procedures. Examples of such procedures include the following:

(1) A mixture of the 1-aminoanthraquinone, an aldehyde of the aliphatic, cycloaliphatic, aromatic or heterocyclic series and ammonia is heated at 90°–180° C., preferably in the presence of oxidizing agents, such as nitro compounds or sulfonic acid derivatives thereof, arsenic acid, cupric salts, ammonium vanadate, oxygen or air. A diluent, such as water, alcohols, aromatic and hydroaromatic hydrocarbons or nitro or halogen derivatives thereof, is generally desirable but not necessary.

(2) The 1-aminoanthraquinone, an aliphatic or aromatic nitrile and a hydrogen halide or a compound capable of supplying a hydrogen halide, such as aluminum chloride, are reacted at 100–200° C. The reaction is preferably carried out in a diluent, such as nitrobenzene, phenol, anisole or trichlorobenzene, although an excess of the nitrile can be used if it is a liquid at the reaction temperature. The reaction may be accelerated by the addition of such agents as copper, vanadium, tungsten or molybdenum compounds, alone or in conjunction with the application of pressure.

(3) A 1-acylaminoanthraquinone (where acylation of the amine group can be effected with an aliphatic or an aromatic acid halide) can be heated with ammonia or salt thereof in an organic solvent or diluent, such as phenol, nitrobenzene, a halobenzene, toluene, anisole, aniline, pyridine or quinoline. Reaction promotors such as copper or salts thereof or oxides or salts of vanadium or tungsten may be added if desirable. Reaction temperatures range from about 100–220° C.

Other dyes useful in this invention can be prepared from those anthrapyrimidine dyes where Z (above) is Cl, or preferably Br, by heating the dye with an alcohol, phenol or thiophenol in the presence of a base, such as an alkali metal hydroxide or carbonate. A solvent such as dimethylformamide or pyridine may be added if desired. Alternatively, ammonia or a primary or secondary aliphatic or aromatic amine can be reacted with the haloanthrapyrimidine dye to give the corresponding amino dye. Pressure can be applied for low boiling reactants. Replacement of bromine by a nitrile group can be effected with cuprous cyanide and pyridine.

Representative of the compounds that can be used in the aforementioned ways to produce valuable dyes from haloanthrapyrimidines are those listed in Table 2.

TABLE 2

| | |
|---|---|
| Methanol | 2-bromo-4-t.-butylthiophenol |
| n-Butanol | 4-bromo-2-isopropylthiophenol |
| 2-ethoxyethanol | 2-methyl-4-t.-butylthiophenol |
| 2-phenoxyethanol | o-Ethylthiophenol |
| 2-phenylethanol | p-Phenylthiophenol |
| Cyclohexanol | m-Mercaptobutyranilide |
| Phenol | 4-t.-butyl-4'-mercaptobenzanilide |
| o-, m- or p-cresol | 4-methoxy-3-thiocresol |
| p-n-Dodecylphenol | 2-methoxy-4-thiocresol |
| m- or p-methoxyphenol | 4-chloro-2-thiocresol |
| p-, m- or p-phenylphenol | 5-chloro-2-methoxythiophenol |
| m-Valerylaminophenol | 6-methoxy-3-thiocresol |
| p-Benzamidophenol | 4-bromo-3-thiocresol |
| m-(4-chlorobenzamido)-phenol | 2-thionaphthol |
| Thiophenol | n-Butylamine |
| o-, m- or p-thiocresol | n-Dodecylamine |
| Thioxylenols | Diethylamine |
| 4-n-octylthiophenol | Cyclohexylamine |
| o-Methoxythiophenol | N-butylcyclohexylamine |
| p-Octyloxythiophenol | Aniline |
| p-Phenoxythiophenol | N-methylaniline |
| p-Fluorothiophenol | o-, m- or p-toluidine |
| p-Chlorothiophenol | o-, m- or p-anisidine |
| m-Bromothiophenol | p-n-Dodecylaniline |
| p-Aminocaproanilide | p-n-Butoxyaniline |
| 3'-aminobenzanilide | p-Aminoacetanilide |
| 3'-amino-4-t.-butyl benzanilide | 2,4-, 2,5- or 3,5-dimethoxy aniline |
| 2,3-, 2,4-, 2,5-, 3,4- or 3,5-xylidine | 3,4-diethoxyaniline |
| | Cresidine |
| | 3-isopropyl-4-anisidine |

In an alternative route to 4-phenylthioanthrapyrimidines, the aforesaid intermediate anthraquinone where Z is Cl or Br first can be condensed with thiophenol or a derivative thereof, as exemplified in Table 2, and the resulting 1-amino-2-phenylthio-4-arylaminoanthraquinone then can be converted to the corresponding anthrapyrimidine as described above.

The cellulosic materials which can be dyed with the dyes employed in this invention by the previously described Blackwell et al. process include all forms of cellulose which increase in size and in flexibility upon exposure to water. Suitable materials include natural fibers and purified wood pulps as well as reconstituted cellulose in fiber and film form. Cotton fibers can be dyed in any of the forms in which they are conventionally used in textile materials and after any of the treatments conventionally used to prepare them for dyeing. Also included is cotton which has been treated in any way which does not significantly reduce its swelling upon heating with water; raw or scoured cotton and cotton which has been mercerized or otherwise preshrunk are dyeable. Reconstituted cellulosic fibers which are sufficiently open in structure so that they are swollen by water and penetrated by a dye solvent are dyeable, for example, cuprammonium rayon. Xanthate viscose rayon normally has a structure which is more difficult to swell and may require exposure to dye, water, and dye solvent for somewhat longer times at lower temperatures. To facilitate dyeing, such fabrics can be pretreated with dilute (about 10%) aqueous caustic or the dyeing can be carried out in the presence of wetting agents, preferably of the nonionic type. Mixtures of cotton and rayon fibers can be dyed, and the dyes employed herein also can be used to dye purified wood pulp and paper. Excluded as the water swellable cellulosic material, as considered herein, is cellulose acetate which does not exhibit the requisite swellability in the presence of water.

The synthetic materials which can be dyed with the dyes employed in this invention include polyesters, polyamides, cellulose ethers and esters, and copolymers and mixtures thereof with other components intended to make them more easily dyeable or to add other desirable properties. The aforesaid dyes can be applied to synthetic materials by a conventional Thermosol dyeing procedure.

The dyes employed in this invention can be applied to water swellable cellulosic materials, or to blends or mixtures thereof with synthetic materials, by the above-described Blackwell et al. process. The dyes employed in this invention are particularly useful for dyeing mixtures and blends of cotton and polyester or polyamide, such as mixtures containing 50 to 80% polyethylene terephthalate and 20 to 50% cotton. In such mixtures, the synthetic material is dyed using conventional process conditions. Since the aforesaid dyes can be used to dye both components in a blend or mixture, scourability as a factor in dye selection is avoided since the previously described cross-staining problem (encountered when two different types of dyes are employed) has been minimized.

The dyes employed in this invention dye the substrate directly, that is, they do not require oxidation, reduction, hydrolysis, or any other chemical modification for development of color or fastness. The dyes exhibit, in general, an unusual degree of lightfastness in pastel to medium shades. Fastness to washing, drycleaning, sublimation and crocking also is generally good in this shade range.

In dyeing cellulosic materials with the aforesaid dyes using the Blackwell et al. process, water, dye, and dye solvent can be applied to the substrate in any sequence as long as water and dye solvent are simultaneously present at some stage which is either before or simultaneous with actual dyeing. The preferred method for dyeing fabrics composed of cellulosic fibers or mixtures of cellulosic and synthetic fibers is to impregnate the fabric with a mixture of one or more dyes, water, and dye solvent in a conventional dye padbath followed by squeezing to remove excess dye liquor, or to print with a solvent-containing printing paste, and subsequently heating to evaporate sufficient water to effect dissolution of the dye, at which time the fabric is dyed. Alternatively, water is evaporated, but in an insufficient amount to effect dissolution of the dye, after which pressure and heat are applied to effect dissolution without further evaporation of water. Dye pastes can be prepared by conventional techniques such as by milling the dye in the presence of a dispersing agent or surfactant. A dyebath can be prepared by diluting the dye paste with water or with aqueous solvent. Addition of a solvent to the dye paste before addition of water may cause dye separation and usually is avoided. It will be understood by those skilled in the art that additives other than a dye solvent and a dispersing agent can be present in dyebaths. Such additives frequently include migration inhibitors such as purified vegetable gums and wetting agents, examples of which are ionic and nonionic surfactants such as ethylene oxide condensation products, hydrocarbon sulfonates and long-chain alcohol sulfates. Dyebaths used in practicing this invention also can contain dyes other than those employed in this invention; for example, direct dyes or fiber reactive dyes for cotton or for polyamides can be present for shading purposes.

In the preferred dyeing procedure with the dyes employed in this invention, an aqueous dye dispersion and the organic solvent are applied to the fabric from a single padbath. The amount of water in the padbath usually is 70–95 weight percent and the solvent, 5–30 weight percent. The padded fabric is heated at 180–225° C. for 30–180 seconds. For cotton, temperatures as low as 150° C. usually are adequate. The dyed fabric generally is given an aqueous scour, or an aqueous scour followed by a perchloroethylene scour, to ensure complete removal of surface dye.

The minimum shade depth of a dyed water swellable cellulosic material that is within this invention is defined as having a reflectance color value (S') of at least 0.4 (using a modification of the reeflctance color value S given in British Pat. 1,056,358) after the dyed fabric has been scoured in aqueous detergent at 90–100° C. and then in perchloroethylene at 50° C.

The reflectance color value is given by the equation $$S = (L + M + N)$$

where L, M and N replace the well-known standard colorimetric values X, Y and Z set up by the CIE (Commission Internationale d'Eclairage). Whereas $$X, Y, Z = \int R_\lambda E_\lambda (\bar{x}, \bar{y}, \bar{z}) d\lambda \quad \text{(i)}$$

(where $R_\lambda$ = reflectance characteristic of the wave length $E_\lambda$ = radiation function of the illuminant and $\bar{x}, \bar{y}$ & $\bar{z}$ = CIE distribution coefficients which characterize a particular color), $$L, M, N = \frac{1}{K_0} \int F_\lambda E_\lambda (\bar{x}, \bar{y}, \bar{z}) d\lambda \quad \text{(ii)}$$

(where $K_0$ = dyestuff concentration and $$F_\lambda = \frac{(1 - R_\lambda)^2}{2(1-r)(R_\lambda - r)}$$

where $R_\lambda$ is defined above and $r$ = residual surface reflectance of the substrate when dyed completely black).

The sum of $(L+M+N)$, as the terms are defined in Equation ii, is a constant for a given dye and independent of the concentration of dye on the substrate. In order to obtain values for $(L+M+N)$ which are proportional to the shade depth of the dyed fabric, the concentration term $1/K_0$ has been removed from Equation ii; since it is desirable to obtain numbers in the 0–25 range, the values of the summation $(L+M+N)$ have been further modified by dividing by 100. This new summation, as used herein and represented by S', is related to S as defined in British Pat. 1,056,358 by the equation $$S' = \frac{K_0}{100} \times S$$

where $K_0$ is as defined above.

A reflectance color value (S') of 0.4 represents a pastel shade, but a shade that is far deeper than that obtainable by applying the dyes described herein by a vatting procedure, which vatting procedure results in essentially no coloration of the cellulosic fibers. Furthermore, in the aforesaid pastel shades the dyes employed herein show unusual fastness to light. By increasing the concentration of dye in the padbath, shade depths of many times this figure can be achieved readily.

The following demonstrates the advantage of using the dyes employed in this invention in the Blackwell et al. process, as opposed to conventional vatting procedures, in the dyeing of cotton. A piece of cotton poplin was padded with an aqueous bath containing 50 grams per liter of a 15% aqueous dispersion of the dye of Experiment 2. Pickup was 50–60%. The fabric was dried and then padded with an aqueous solution containing caustic soda (45 grams per liter) and sodium hydrosulfite (45 grams per liter). The cloth was steamed for 30 seconds at 104° C. and rinsed. The cotton was then treated for 10 minutes in an aqueous solution of sodium perborate (25 grams per liter) at 49° C. Next, the material was soaped for 5 minutes at 93° C. in 2% oleate soap solution, rinsed thoroughly and dried. Finally, the pink tinted material was scoured in perchloroethylene at 50° C. for 5 minutes. Almost all of the color was removed from the fabric. Similar results were obtained with the dyes of Experiments 7, 8, 23 and 24. In contrast to this as shown below in Examples 33–37, pink shades, fast to the perchloroethylene scour, were produced when the dyes were applied by the Blackwell et al. process.

The following experiments illustrate typical preparative procedures for the dyes employed in this invention. Parts are given by weight unless otherwise indicated.

EXPERIMENT 1

Preparation of 2-phenyl-4-methyl-6-(p-toluidino)-anthrapyrimidine

Ammonia was passed through a mixture of 34 parts of 1-amino-2-methyl-4-(p - toluidino)anthraquinone, 44 parts of benzaldehyde, 200 parts of nitrobenzene and copper sulfate which has been heated to 160–165° C. The reaction was completed within 3 hours (followed by thin layer chromatography). The reaction mass was cooled and ethanol was added to keep the precipitated solids from becoming too thick. The product was isolated by filtration, washed with ethanol, and then with hot water and dried. The chromatographically pure dye 2-phenyl-4-methyl-6-(p-toluidino)anthrapyrimidine showed an absorption peak at 495 m$\mu$.

EXPERIMENT 2

Preparation of 4-bromo-2-phenyl-6-(p-toluidino)-anthrapyrimidine

The procedure of Experiment 1 was repeated, except that 1-amino-2-methyl-4-(p-toluidino)anthraquinone was replaced with an equivalent molar amount of 1-amino-2-bromo-4-(p-toluidino)anthraquinone. The bluish red chromatographically pure dye 4-bromo-2-phenyl-6-(p-toluidino)anthrapyrimidine had an absorptivity of 36.3 liters gm.$^{-1}$ cm.$^{-1}$ at 505 m$\mu$.

EXPERIMENT 3

Preparation of 6-anilino-4-phenylthio-2-phenyl-anthrapyrimidine

To a mixture of 9.56 parts of 6-anilino-4-bromo-2-phenylanthrapyrimidine (prepared by the procedure of Experiment 2 from 1-amino-4-anilino-2-bromoanthraquinone), 2.42 parts of thiophenol and 60 parts of pyridine were added 16 parts of 30% aqueous sodium hydroxide solution. The mixture was heated to 95° C. for 5 minutes, then poured into 800 parts of water, and acidified with hydrochloric acid. The resultant slurry was heated to 70° C. and the product was isolated by filtration. The solids were reslurried in 100 parts of boiling isopropanol and the slurry was allowed to cool with stirring. The product was isolated by filtration and dried. Thin layer chromatography (T.L.C.) showed that no starting material was present and that only a trace of a yellow impurity contaminated the reddish orange dye. The dye 6-anilino-4-phenylthio-2-phenylanthrapyrimidine had an absorptivity of 42.6 liters gm.$^{-1}$ cm.$^{-1}$ at 511 m$\mu$. The visible spectrum also exhibited a shoulder at 485 m$\mu$.

EXPERIMENT 4

Preparation of 2-phenyl-4-anilino-6-(p-toluidino)-anthrapyrimidine

A mixture of 5 parts of the dye of Experiment 2 and 15 parts of aniline were heated under reflux for 3 hours. The reaction mixture was cooled to room temperature and 35 parts of benzene were added. Filtration of the mass yielded an orange dye that was shown by T.L.C. to be free of starting material. The dye 2-phenyl-4-anilino-6-(p-toluidino)anthrapyrimidine had an absorptivity of 37.2 liters gm.$^{-1}$ cm.$^{-1}$ at 480 m$\mu$ and 47.7 liters gm.$^{-1}$ cm.$^{-1}$ at 513 m$\mu$.

EXPERIMENTS 5–32

Employing procedures similar to the above, additional dyes, useful in the present invention, were prepared. Table 3 depicts the additional dyes and their characteristics. In the table, the substituents correspond to those in the general formula previously defined. In each case, $R^9$ is H.

TABLE 3

| Experiment | R₁ | X | R₃ | $a_{max}$ (liters gm.⁻¹ cm.⁻¹) | M.P. (° C.) |
|---|---|---|---|---|---|
| 5 | H | H | p-CH₃ | 44.7 at 500 mμ | |
| 6 | H | Br | H | 37.4 at 508 mμ | |
| 7 | H | Br | o-OCH₃ | | |
| 8 | H | Br | p-OCH₃ | | |
| 9 | H | Br | o-OC₂H₅ | | |
| 10 | H | Br | p-C₁₂H₂₅ | | 164.5–168 |
| 11 | H | Br | p-Cl | | |
| 12 | H | Br | m-Cl | | |
| 13 | H | Br | o-C₆H₅ | | 258–270 |
| 14 | H | Br | p-OC₆H₅ | | 224–228 |
| 15 | p-CH₃ | Br | p-CH₃ | | |
| 16 | p-OCH₃ | Br | p-CH₃ | 33.0 at 520 mμ | |
| 17 | H | Br | p-CO₂C₂H₅ | | |
| 18 | H | OC₂H₄OC₂H₅ | H | | |
| 19 | H | O—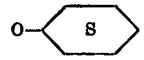  | p-CH₃ | | |
| 20 | H | OC₆H₅ | H | | |
| 21 | H | OC₂H₄C₆H₅ | p-CH₃ | | |
| 22 | H | SC₆H₅ | H | 32.5 at 485 mμ | |
| 23 | H | SC₆H₅ | p-CH₃ | | |
| 24 | H | SC₆H₅ | p-OCH₃ | | |
| 25 | H | SC₆H₅ | p-OCH₃ | | |
| 26 | H | S——t.-butyl | H | 39.6 at 511 mμ | |
| 27 | H | Same as above | p-CH₃ | | |
| 28 | H | S——Cl | p-CH₃ | | |
| 29 | H | SC₆H₅ | p-C₄H₉ | | 237–239 |
| 30 | G | CONH—t.-butyl | H | | 231–234 |
| 31 | H | CON(CH₃)₂ | H | | |
| 32 | H | CN | p-CH₃ | | 284–300 |

The following examples illustrate the preparation of the dyed fibers of this invention. When the dyes of Experiments 1–32 were used to dye or print cotton or polyester/cotton blend fabrics by the procedures of Examples 1, 33, 38 and 39, level shades of good to excellent fastness to washing, drycleaning, light and sublimation and fair to excellent fastness to crocking were produced.

Table 4 shows the shades obtained when polyester/cotton blend fabrics were dyed, by the procedure of Example 1, with the dyes of Experiments 5–32.

TABLE 4

| Dye of Expt. No.: | Shade |
|---|---|
| 5 | Pink to bluish red. |
| 6 | Pink to bluish red. |
| 7 | Pink to bluish red. |
| 8 | Pink to bluish red. |
| 9 | Pink to bluish red. |
| 10 | Pink to bluish red. |
| 11 | Pink to bluish red. |
| 12 | Salmon pink to red. |
| 13 | Salmon pink to red. |
| 14 | Pink to bluish red. |
| 15 | Pink to bluish red. |
| 16 | Bluish pink to rubine. |
| 17 | Pink to bluish red. |
| 18 | Orange. |
| 19 | Orange. |
| 20 | Orange. |
| 21 | Salmon pink to red. |
| 22 | Orange. |
| 23 | Pink to bluish red. |
| 24 | Pink to bluish red. |
| 25 | Pink to bluish red. |
| 26 | Orange. |
| 27 | Pink to bluish red. |
| 28 | Pink to bluish red. |
| 29 | Pink to bluish red. |
| 30 | Pink to bluish red. |
| 31 | Pink to bluish red. |
| 32 | Violet. |

EXAMPLE 1

Dyeing 65/35 "Dacron" polyester/cotton blend fabric (A) A padbath was prepared from:

| | Grams |
|---|---|
| An aqueous dye paste (15% active ingredient) containing the dye of Experiment 1 | 2 |
| Purified vegetable gum thickener | 20 |
| Methoxypolyethylene glycol (molecular weight 550) | 56.2 |
| Butyl Carbitol | 18.7 |
| Boric acid | 3.6 |
| Water to 1 liter. | |

A continuous length of 65/35 "Dacron" polyester/cotton fabric was padded at 60% uptake, based on the weight of the fiber, and the padded fabric was passed at a rate of 2 yards per minute between two 1,000-watt infrared lamps (Fostoria-Fannon, Inc., Infrared Heater Model 6624), with each lamp shining on opposite surfaces of the fabric from a distance of about 3 inches. The continuously-moving fabric was passed through a circulating air oven at 80–100° C., with a hold-up time of one minute, and then through an oven at 200–210° C. with a hold-up time of 1.7 minutes. The hot dry fabric was cooled to room temperature and rinsed for one minute each in sequence: in water at 20–30° C., in water at 90–95° C., at 90–95° C. in water containing 1% of an ether-alcohol sulfate detergent, in water at 90–95° C., and in water at 20–30° C. The material was dried and then scoured for 5 minutes in perchloroethylene at 50° C. A uniform salmon pink shade of good fastness was produced.

(B) Part A was repeated except that 50 grams/liter of dye paste were used in the padbath and the heating was carried out as follows. The padded fabric was passed at a rate of 2 yards per minute between banks of infrared lamps, with one 1,000-watt lamp (Fostoria-Fannon, Inc., Infrared Heater Model 6624) shining on each surface perpendicular to the fabric from a distance of about 3 inches. The moist fabric was then passed over a series of four revolving smooth surfaced drums increasing stepwise in temperature from 100° C. to about 150° C. The average contact time on each drum was about 18 seconds. Next, the fabric moved continuously into an oven held at about 210° C. where the total contact time was about 90 seconds. A uniform salmon pink shade of good fastness was produced.

EXAMPLES 2–32

Example 1A was repeated except that the dyes of Experiments 2–32 were employed at padbath concentrations ranging from 2 to 100 grams/liter of 15% aqueous dye dispersion. The polyester-cotton blend fabric was uniformly dyed in each case in the shade indicated above in Experiments 2, 3 and 4 and in Table 4. Fastness properties were generally good to excellent. Removal of the cotton component in each case by dissolving in 70% sulfuric acid indicated that the cotton portion had been dyed to a strength comparable to that of the blend fabric.

EXAMPLE 33

Dyeing cotton broadcloth (A) Example 1A was repeated except that a 100% mercerized cotton broadcloth was employed, the dye of Experiment 2 was used in place of the dye of Experiment 1, the amount of glycol, Carbitol and boric acid each was increased 50%, and the maximum temperature was reduced to about 180° C. The cotton cloth was dyed a uniform pink shade. After the material was scoured in aqueous detergent, then in perchloroethylene at 50° C. for 5 minutes, and dried, as described above, it exhibited a reflectance color value of 0.46.

EXAMPLES 34–37

When Example 33 was repeated, using the dyes of Experiments 7, 8, 23 and 24 in place of the dye of Experiment 1, uniform pink shades of comparable strength and fastness to the dyed fabric of Example 33 were obtained.

EXAMPLE 38

Printing of 100% cotton fabric

A cotton fabric was padded to about 70% pickup with an aqueous solution containing 200 grams per liter of polyethylene glycol (M.W. 350). The padded fabric was heated at 160° C. for 5 minutes to evaporate water. The fabric was then printed in a pattern with a print paste prepared from:

|  | Grams |
|---|---|
| An aqueous violet paste (15% active ingredient) containing the dye of Experiment 32 | 10 |
| Purified natural gum ether thickener | 60 |
| Water | 30 |

The printed fabric was heated at 180° C. for 100 seconds, scoured in water containing an ether-alcohol sulfate detergent at about 90° C. for 5 minutes, dried, scoured in tetrachloroethylene at about 50° C. for 5 minutes and dried. The printed areas were strongly dyed.

EXAMPLE 39

Printing of 65/35 "Dacron" polyester/cotton blend fabric

Example 38 was repeated except that a 65/35 "Dacron" polyester/cotton fabric was employed, the glycol was reduced to 125 grams per liter, and the maximum temperature was increased to 200° C. The fastness results of the prints obtained were comparable to those of fabric dyed with the same dye by the procedure of Example 1.

The embodiments of the invention in which an exclusive property or privilege is claimed are defined as follows:

1. Uniformly dyed orange to violet water swellable cellulosic fibers, said fibers being fast to light, washing, drycleaning and sublimation and exhibiting a reflectance color value (S') after scour of at least 0.4, said dyed fibers being produced by contacting water swellable cellulosic fibers sequentially or concomitantly with water, ethylene glycol or a derivative thereof and, while the fibers are still swollen, the essentially water insoluble, non-vattable anthrapyrimidine dye having the formula wherein X is H, Cl, Br, CN, $CONR^2R^3$, alkyl, $NH_2NR^2R^3$, $OR^4$ or $S-\langle\bigcirc\rangle\genfrac{}{}{0pt}{}{R^5}{R^6}$ Y is $-\langle\bigcirc\rangle\genfrac{}{}{0pt}{}{R^8}{R^9}$ $R^1$ is H, alkyl or Oalkyl,
$R^2$ is H or $C_{1-4}$ alkyl,
$R^3$ is alkyl, cyclohexyl or $-\langle\bigcirc\rangle\genfrac{}{}{0pt}{}{R^6}{R^7}$ $R^4$ is alkyl, cyclohexyl, $-C_2H_4Oalkyl$, $-C_2H_4phenyl$, $C_2H_4Ophenyl$ or $-\langle\bigcirc\rangle\genfrac{}{}{0pt}{}{}{R^7}$ $R^5$ is H, alkyl or Oalkyl,
$R^6$ is H, F, Cl, Br, alkyl, Oalkyl, NHCOalkyl or NHCOaryl,
$R^7$ is H, alkyl, Oalkyl, NHCOalkyl or NHCOaryl,
$R^8$ is H, F, Cl, Br, alkyl, Oalkyl, NHCOalkyl or NHCOaryl, and
$R^9$ is H, F, Cl, Br, alkyl, Oalkyl, NHCOalkyl, NHCOaryl, aryl, aryloxy, $CF_3$, CN, COalkyl, COaryl, $CO_2$alkyl, $CO_2$aryl, CONHalkyl, $CON(alkyl)_2$, CONHaryl or CON(alkyl)aryl,
  wherein said X, $R^1$ and $R^3$ through $R^9$, alkyl is $C_{1-12}$ alkyl and aryl is phenyl or phenyl substituted with Cl, Br, $C_{1-4}$ alkyl or $C_{1-4}$ alkoxy.

2. The fibers of claim 1 wherein the dye is 4-bromo-2-phenyl-6-(p-toluidino)anthrapyrimidine.

3. The fibers of claim 1 wherein the fibers are cotton fibers.

4. The fibers of claim 1 admixed or blended with synthetic fibers which have been dyed with said anthrapyrimidine dye.

5. The fibers of claim 4 wherein the synthetic fibers are polyester fibers.

(References on following page)

References Cited

UNITED STATES PATENTS 2,212,928   8/1940   Berthold ---------- 280—261
3,653,800   4/1972   Blackwell ---------- 8—39 C

OTHER REFERENCES

Cockett: "Dyeing of Cellulose Fibers and Related Processes," p. 291, pub. by Academic Press, New York, N.Y., 1961.

Fortess et al.: American Dyestuff Rep., May 27, 1963, pp. 402–411.

Kenion et al.: J. S. Dyers and Col., June 1964, pp. 312–322.

DONALD LEVY, Primary Examiner

U.S. Cl. X.R.

8—39, 34, 173, 174, 93